(12) United States Patent
Bowen

(10) Patent No.: US 6,702,709 B2
(45) Date of Patent: Mar. 9, 2004

(54) DRIVETRAIN FOR HYBRID MOTOR VEHICLE

(75) Inventor: Thomas C. Bowen, Rochester Hills, MI (US)

(73) Assignee: New Venture Gear, Inc., Troy, MI (US)

(*) Notice: Subject to any disclaimer, the term of this patent is extended or adjusted under 35 U.S.C. 154(b) by 108 days.

(21) Appl. No.: 10/081,364

(22) Filed: Feb. 22, 2002

(65) Prior Publication Data
US 2002/0177500 A1 Nov. 28, 2002

Related U.S. Application Data
(60) Provisional application No. 60/282,511, filed on Apr. 9, 2001.

(51) Int. Cl.$^7$ ............................................. F16H 3/62
(52) U.S. Cl. ..................... 475/277; 475/5; 475/314; 475/320
(58) Field of Search ................... 475/1, 5, 206, 475/277, 282, 288, 311, 314, 317, 320; 477/3, 5, 6, 8

(56) References Cited

U.S. PATENT DOCUMENTS

| | | | | |
|---|---|---|---|---|
| 5,083,992 A | * | 1/1992 | Asada | 475/288 X |
| 5,098,357 A | * | 3/1992 | Asada et al. | 475/288 X |
| 5,513,719 A | | 5/1996 | Moroto et al. | |
| 5,800,303 A | * | 9/1998 | Benford | 475/277 X |
| 5,916,050 A | * | 6/1999 | Coutant et al. | 475/5 |
| 5,943,918 A | | 8/1999 | Reed, Jr. et al. | |
| 5,944,630 A | * | 8/1999 | Omote | 477/5 |
| 5,984,821 A | * | 11/1999 | Showalter | 475/206 X |
| 6,019,698 A | | 2/2000 | Lawrie et al. | |
| 6,019,699 A | * | 2/2000 | Hoshiya et al. | 477/5 X |
| 6,030,312 A | * | 2/2000 | Nesbitt et al. | 475/206 |
| 6,041,877 A | | 3/2000 | Yamada et al. | |
| 6,059,684 A | | 5/2000 | Sasaki et al. | |
| 6,083,138 A | | 7/2000 | Aoyama et al. | |
| 6,170,587 B1 | | 1/2001 | Bullock | |
| 6,371,882 B1 | * | 4/2002 | Casey et al. | 477/5 |

FOREIGN PATENT DOCUMENTS

| | | | | |
|---|---|---|---|---|
| JP | 402146338 | * | 6/1990 | 475/277 |
| JP | 402154838 | * | 6/1990 | 475/277 |

* cited by examiner

Primary Examiner—Ha Ho
(74) Attorney, Agent, or Firm—Harness, Dickey & Pierce P.L.C.

(57) ABSTRACT

A hybrid transmission includes a multi-speed planetary gearbox, an automated shift system, and an electric motor/generator. The electric motor is operably controlled to drive the gearbox to establish an electric drive mode. The electric mode is further operable to provide a speed synchronization function during sequential gear shifting. The transmission includes plurality of power-operated clutches arranged to selectively engage components of the planetary geartbox to establish the distinct gear ratios. A central system functions to control automated operation of the power-operated clutches as well coordinated actuation of the engine and the electric motor.

29 Claims, 9 Drawing Sheets

| SPEED | FIRST CLUTCH 90 | SECOND CLUTCH 94 | THIRD CLUTCH 96 | FOURTH CLUTCH 98 | FIFTH CLUTCH 102 | SIXTH CLUTCH 104 | SEVENTH CLUTCH 108 | EIGHTH CLUTCH 112 | RATIO |
|---|---|---|---|---|---|---|---|---|---|
| 1 |   |   | X |   |   | X | X |   | 4.1709 |
| 2 |   |   |   |   | X | X | X | X | 2.8729 |
| 3 | X |   | X | X |   |   | X |   | 1.5294 |
| 4 | X |   |   |   | X |   | X | X | 1.0534 |
| 5 | X | X |   | X |   |   |   | X | 0.6888 |

DRIVETRAIN FOR HYBRID MOTOR VEHICLE

CROSS-REFERENCE TO RELATED APPLICATIONS

This application claims the benefit of U.S. Provisional Application No. 60/282,511 filed Apr. 9, 2001.

FIELD OF THE INVENTION

The present invention relates generally to hybrid motor vehicles and, more particularly, to a hybrid automatic transmission adapted for installation in the drivetrain of a hybrid motor vehicle.

BACKGROUND OF THE INVENTION

Automobile manufacturers are constantly working to improve fuel efficiency. Improvements in fuel efficiency are typically directed to reduced weight, improved aerodynamics, and reduced power losses through the powertrain. However, the need to improve fuel efficiency is commonly offset by the need to provide enhanced comfort and convenience to the vehicle operator. As an example, manually-shifted transmissions are more fuel efficient than automatic transmissions due to lower parasitic losses. The higher losses associated with conventional automatic transmissions originate in the torque converter, the plate clutches and the hydraulic pump used to control operation of the hydraulic shift system. However, a vast majority of domestic passenger vehicles are equipped with automatic transmissions due to the increased operator convenience they provide. Recent advances in power-operated shift systems have allowed development of "automated" versions of manual transmissions which automatically shift between sequential gear ratios without any input from the vehicle operator. Thus, automated manual transmissions provide the convenience of a traditional automatic transmission with the efficiency of a manual transmission.

Automobile manufacturers are also actively working to develop alternative powertrain systems in an effort to reduce the level of pollutants exhausted into the air by conventional powertrains equipped with internal combustion engines. Significant development efforts have been directed to electric and fuel-cell vehicles. Unfortunately, these alternative powertrain systems suffer from several disadvantages and, for all practical purposes, are still under development. However, several different "hybrid" electric vehicles have recently been offered for sale. These hybrid vehicles are equipped with an internal combustion engine and an electric motor that can be operated independently or in combination to provide motive power to the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle.

Regardless of the type of hybrid drive system used, hybrid vehicles are highly modified versions of conventional vehicles that are expensive due to the componentry, required control systems, and specialized packaging requirements. Thus, a need exists to develop hybrid powertrains for use in vehicles that utilize many conventional powertain components so as to minimize specialized packaging and reduce cost.

SUMMARY OF THE INVENTION

It is therefore an object of the present invention to provide a parallel-type hybrid powertrain or drive system for a motor vehicle.

In accordance with this object, the hybrid drive system of the present invention includes a hybrid automatic transmission that can be installed in place of a conventional transmission between the engine and the driveline of the motor vehicle.

As a related object, the hybrid automatic transmission of the present invention includes a multi-speed planetary gearbox, an automated shift system, and an electric motor. The electric motor is operably controlled to drive the multi-speed planetary gearbox and to provide a speed synchronization function during gear shifting.

These and other objects are provided by a multi-speed transmission having an input shaft driven by the engine, an output shaft connected to the driveline, an electric motor, a planetary gearset driven by one or both of the engine and the electric motor, a plurality of power-operated clutches operable for selectively engaging components of the planetary gearset, and a control system for controlling automated operation of the power-operated clutches and coordinated actuation of the engine and the electric motor.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

DETAILED DESCRIPTION OF THE PREFERRED EMBODIMENTS

The present invention is related to an integrated gearbox and electric motor assembly, hereinafter referred to as a hybrid automatic transmission, which is installed in a hybrid motor vehicle for delivering motive power (i.e., drive torque) to a pair of ground-engaging wheels. The compact arrangement of the electric motor and gearbox in a common housing permits the use of the hybrid automatic transmission in substitution for a conventional automatic transmission. As such, a conventional powertrain can be used in combination with the hybrid automatic transmission to establish a hybrid drive system.

Figure 1:
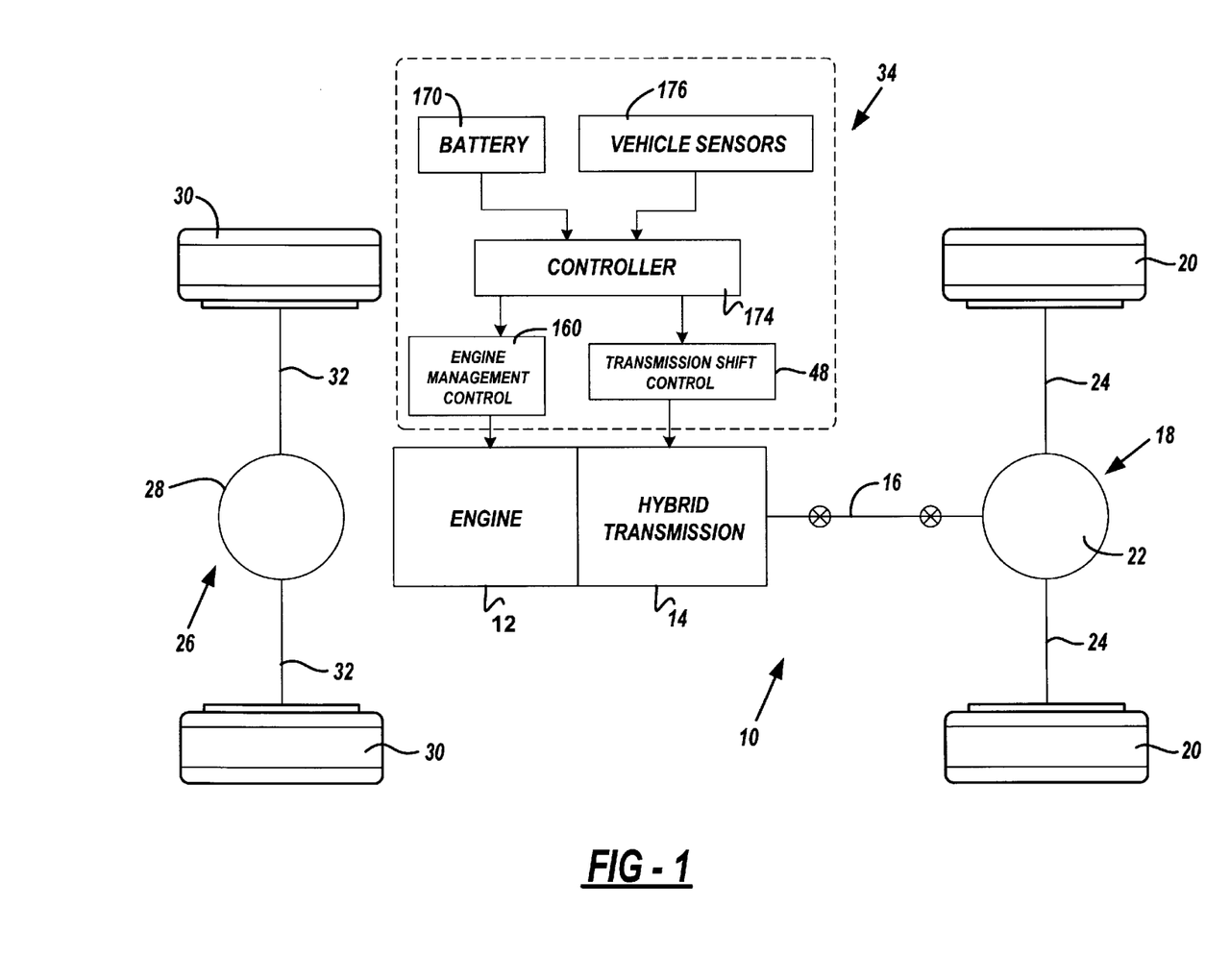
FIG. 1 is a schematic view of a powertrain for a hybrid motor vehicle.

Referring to FIG. 1, a powertrain for a hybrid electric vehicle 10 is shown to include an internal combustion engine 12, a hybrid automatic transmission 14, a drive shaft 16, and a primary axle assembly 18 connecting a first pair of wheels 20. Power from engine 12 and/or hybrid automatic transmission 14 is delivered by drive shaft 16 to a differential unit 22 associated with primary axle assembly 18 which is then transferred through a pair of axleshafts 24 to wheels 20. A secondary axle assembly 26 has a differential unit 28 interconnecting a second pair of wheels 30 via axleshafts 32. Alternatively, the secondary driveline could include only the pair of wheels 30 without axle assembly 26. As will be detailed, an electronic hybrid powertrain control system 34 is used to control various systems associated with engine 12 and hybrid transmission 14 for smoothly transferring motive power to wheels 20.

With reference to FIGS. 2 through 7 of the accompanying drawings, the components and function of hybrid automatic transmission 14 will now be described in greater detail. Transmission 14 is connected to the output of internal combustion engine 12 and generally includes a flywheel damper unit 36, an input brake 38, an input shaft 40, an output shaft 42, a planetary geartrain 44, an electric motor/generator 46, and a transmission shift control system 48.

Figure 2:
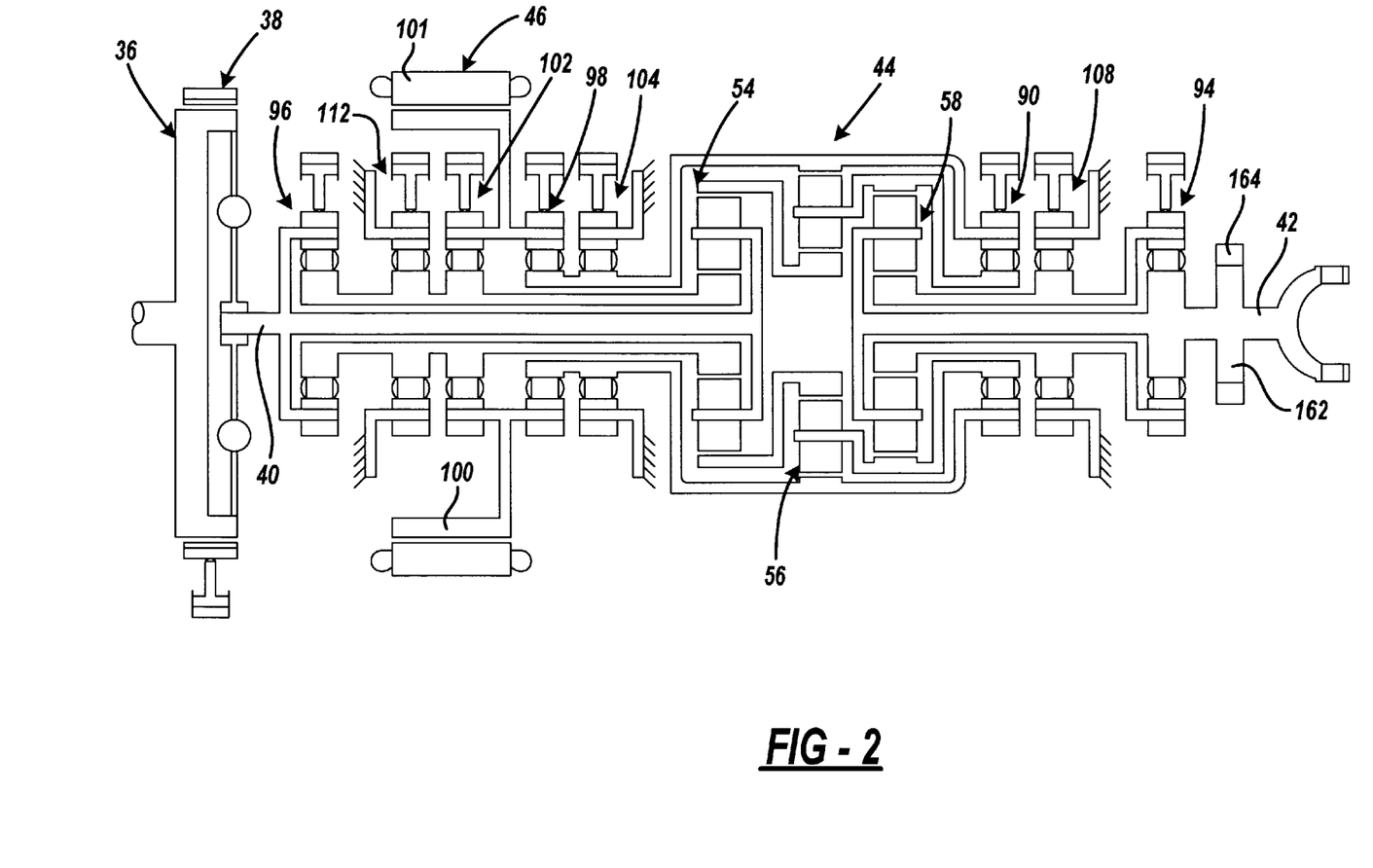
FIG. 2 is a schematic view of a multi-speed hybrid automatic transmission adapted for use in the hybrid motor vehicle shown in FIG. 1.
Figure 3A:
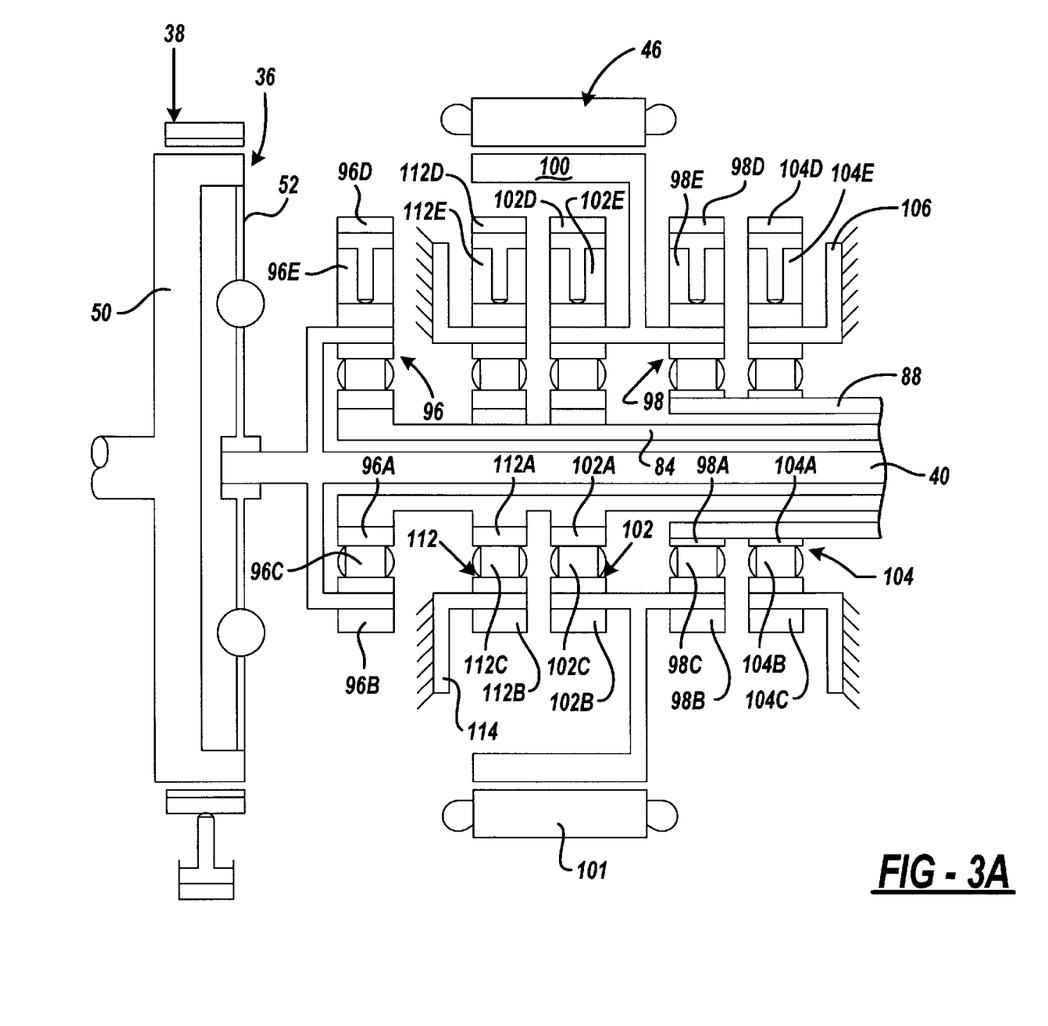
FIGS. 3A and 3B are enlarged partial sectional views of FIG. 2 showing the components of the hybrid automatic transmission in greater detail.
Figure 3B:
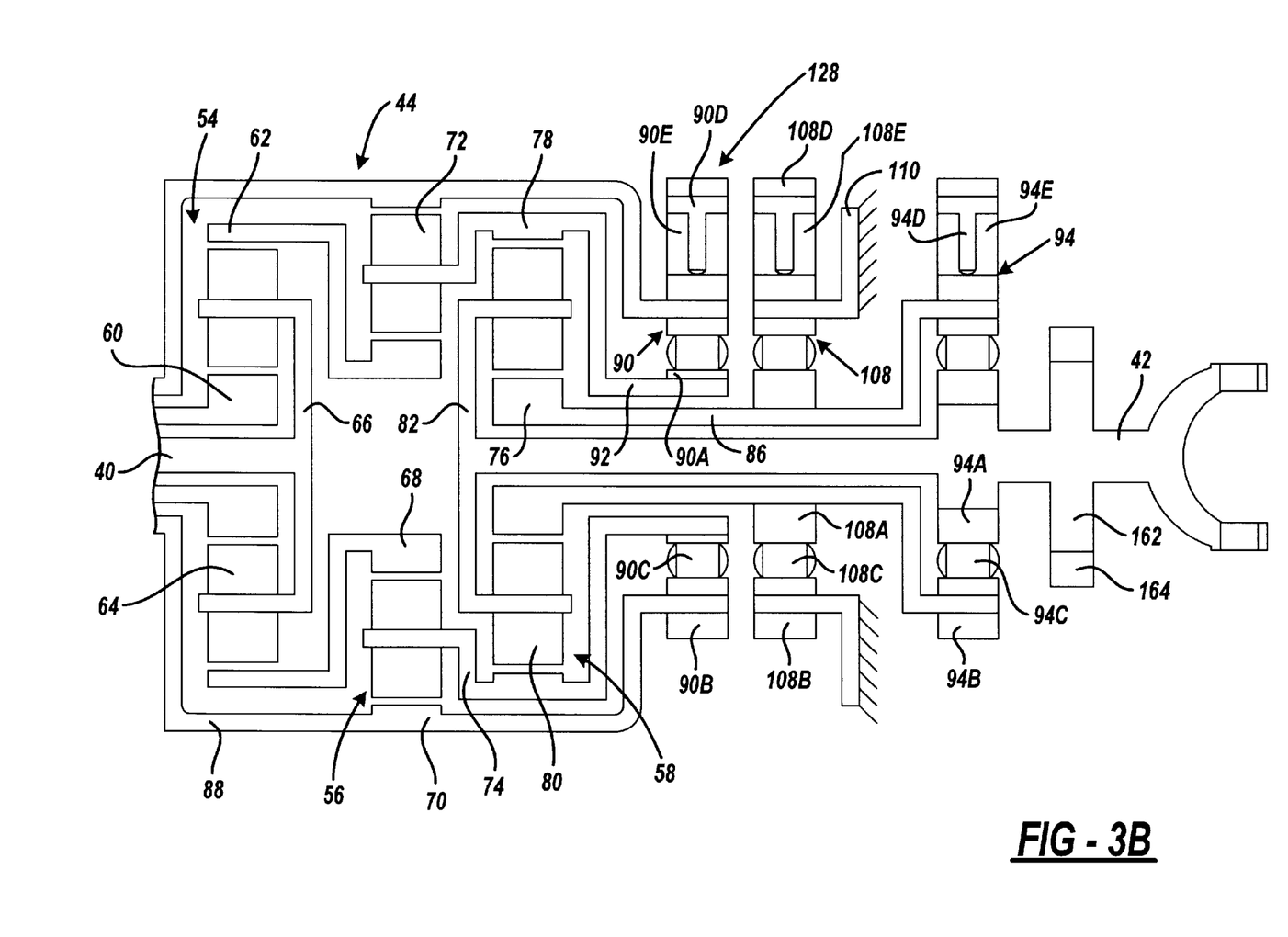

The rotary power generated by engine 12 is delivered to a flywheel 50 of damper unit 36 and through a drive plate 52 to input shaft 40. Geartrain 44 includes a first planetary gearset 54, a second planetary gearset 56 and a third planetary gearset 58. First planetary gearset 54 includes a first sun gear 60, a first ring gear 62 and a set of first planet gears 64 meshed with first sun gear 60 and first ring gear 62. First planet gears 64 are rotatably supported by a first planet carrier 66 which is fixed for common rotation with input shaft 40. Second planetary gearset 56 includes a second sun gear 68 fixed for common rotation with first ring gear 62, a second ring gear 70, and a set of second planet gears 72 meshed with second sun gear 68 and second ring gear 70. Second planet gears 72 are rotatably supported by a second planet carrier 74. Third planetary gearset 58 includes a third sun gear 76, a third ring gear 78 fixed for common rotation with second planet carrier 74, and a set of third planet gears 80 meshed with third sun gear 76 and third ring gear 78. Third planet gears 80 are rotatably supported by a third planet carrier 82 which is fixed for rotation with output shaft 42. Geartrain 44 further includes a first transfer shaft 84 fixed for rotation with first sun gear 60, a second transfer shaft 86 fixed for rotation with third sun gear 76, and a transfer drum 88 fixed for rotation with second ring gear 70. First transfer shaft 84 is shown to concentrically surround and be rotatably supported on input shaft 40. Likewise, second transfer shaft 86 is shown to concentrically surround and be rotatably supported on output shaft 42. Finally, transfer drum 88 is shown to generally surround and enclose all three planetary gearsets.

Shift control system 48 includes a plurality of power-operated clutches. These clutches are dual-mode controllable overrunning clutches. The term "controllable" is used to define the dual mode function of each clutch wherein operation in a "locked" mode results in a bi-directional clutching action and operation in a "released" mode permits freewheeling in both directions. In particular, a first clutch 90 is operable for selectively coupling transfer drum 88 to an extension 92 of third ring gear 78 such that second ring gear 70 can be selectively coupled for common rotation with second planet carrier 74. Thus, with first clutch 90 in its locked mode, second planetary gearset 56 is locked and second sun gear 68 drives third ring gear 78 at a common speed. A second clutch 94 is operable for selectively coupling second transfer shaft 86 to output shaft 42. As such, with second clutch 94 in its locked mode, third planet carrier 82 is coupled to third sun gear 76 such that third planetary gearset 58 is locked and third ring gear 78 drives output shaft 42 at a common speed.

Shift control system 48 further includes a third clutch 96 operable for selectively coupling first transfer shaft 84 to input shaft 40 such that first sun gear 60 is coupled for common rotation with first planet carrier 66. Thus, with third clutch 96 in its locked mode, first planetary gearset 54 is locked and first ring gear 62 is driven at a common speed with input shaft 40. A fourth clutch 98 is operable for selectively coupling a rotor 100 of electric motor 46 to transfer drum 88. A fifth clutch 102 is operable for selectively coupling rotor 100 to first transfer shaft 84. A sixth clutch 104 is operable to selectively couple transfer drum 88 to a stationary member 106. Thus, sixth clutch 104 acts as a brake when locked to prevent rotation of transfer drum 88 and second ring gear 70. A seventh clutch 108 is operable for selectively coupling second transfer shaft 86 to a stationary member 110. Thus, seventh clutch 108 acts as a brake when locked to prevent rotation of second transfer shaft 86 and third sun gear 76. An eighth clutch 112 is operable for selectively coupling first transfer shaft 84 to a stationary member 114. Thus, eighth clutch 112 also acts as a brake when locked to prevent rotation of first sun gear 60.

Figure 4:
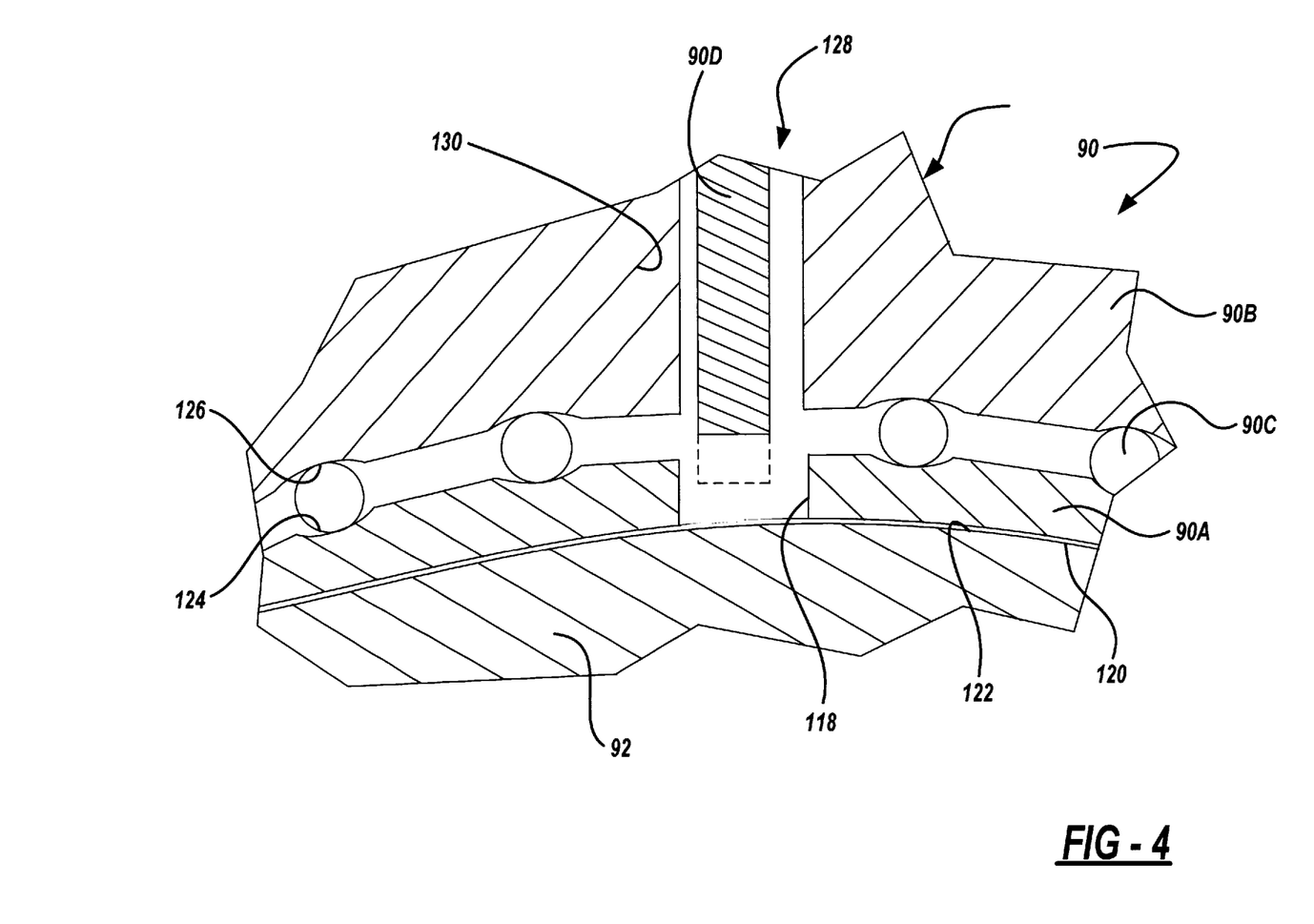
FIG. 4 is a partial sectional view of one of the controllable power-operated clutches associated with the hybrid automatic transmission shown in FIG. 2.

Referring to FIG. 4, the components of first controllable overrunning clutch 90 are shown in detail with the understanding that the second through eighth controllable overrunning clutches have similar structure and function. First overrunning clutch 90 is shown to include an inner ring 90A, an outer ring 90B, and a plurality of locking elements 90C disposed therebetween. Inner ring 90A is a C-shaped split ring which defines a slot 118. Inner ring 90A has an inner cylindrical surface 120 which is supported on outer cylindrical surface 122 of third ring gear extension 92. Outer ring 90B is fixed for common rotation with transfer drum 88. A series of complementary arcuate locking surfaces 124 and 126 are respectively formed in the outer cylindrical surface of inner ring 90A and the inner cylindrical surface of outer ring 90B and which are alignable to define roller pockets. Preferably, locking elements 90C are rollers that are disposed in the roller pockets.

First overrunning clutch 90 also includes a mode shift mechanism 128 which can be selectively actuated to shift first clutch 90 between its locked and released modes. With first clutch 90 in its locked mode, it acts to prevent relative rotation between transfer drum 88 to third ring gear 78 in either direction. In contrast, first clutch 90 functions in its released mode to permit bi-directional relative rotation between transfer drum 88 and third ring gear 78. Mode shift mechanism 128 basically functions to control relative movement between inner ring 90A and outer ring 90B. In the embodiment shown, mode shift mechanism 128 includes a pin 90D extending through a radial aperture 130 formed in outer ring 90B and a spring 90E located between outer ring 90B and a head segment of pin 90D. Spring 90E functions to normally bias pin 90D in a radially outward direction to a first position (shown by solid line in FIG. 4) whereat the terminal end of pin 90D is disengaged from slot 118 in inner ring 90A. With pin 90D in its first position, first bi-directional overrunning clutch 90 functions in its locked mode. That is, rotation of inner ring 90 A relative to outer ring 90B in either direction causes rollers 90C to ride up and engage opposed locking surfaces 124 and 126, frictionally clamping inner ring 90A to third ring gear extension 92. The ability of inner ring 90A to index circumferencially in either direction relative to outer ring 90B causes locking engagement regardless of the direction of relative rotation to accommodate both drive and coast conditions.

When it is desired to shift first overrunning clutch 90 from its locked mode into its released mode, pin 90D is moved in an inward direction from its first position to a second position, in opposition to the biasing of spring 90E. With pin 90D in its second position, its terminal end is positioned within slot 118 of inner ring 90D so as to locate and maintain inner ring 90A in a centered position relative to outer ring 90B. As such, inner ring 90A is prevented from indexing relative to outer ring 90B in either direction such that rollers 90C are centered in the roller pockets. With rollers 90C centered in the roller pockets, inner ring 90A is released from clamped engagement with third ring gear 78 so as to permit bi-directional relative rotation between third ring gear 78 and transfer drum 88. Accordingly, overrunning clutch 90 is operable in its released mode to permit free-wheeling in both directions.

To provide a means for moving pin 90D between its first and second positions for shifting first overrunning clutch 90 between its locked and released modes, shift control system 48 includes a power-operated clutch actuator 132. Clutch actuator 132 is an electrically-activated device operable for moving pin 90D in response to an electric control signal. Preferably, clutch actuator 132 functions in a power-off condition to hold pin 90D in its second position and is shifted into a power on condition in response to the electric control signal for permitting spring 90E to forcibly urge pin 90D to its first position. To this end, clutch actuator 132 can be any suitable two-position device, such as an electromagnetic solenoid operator.

Figure 5:
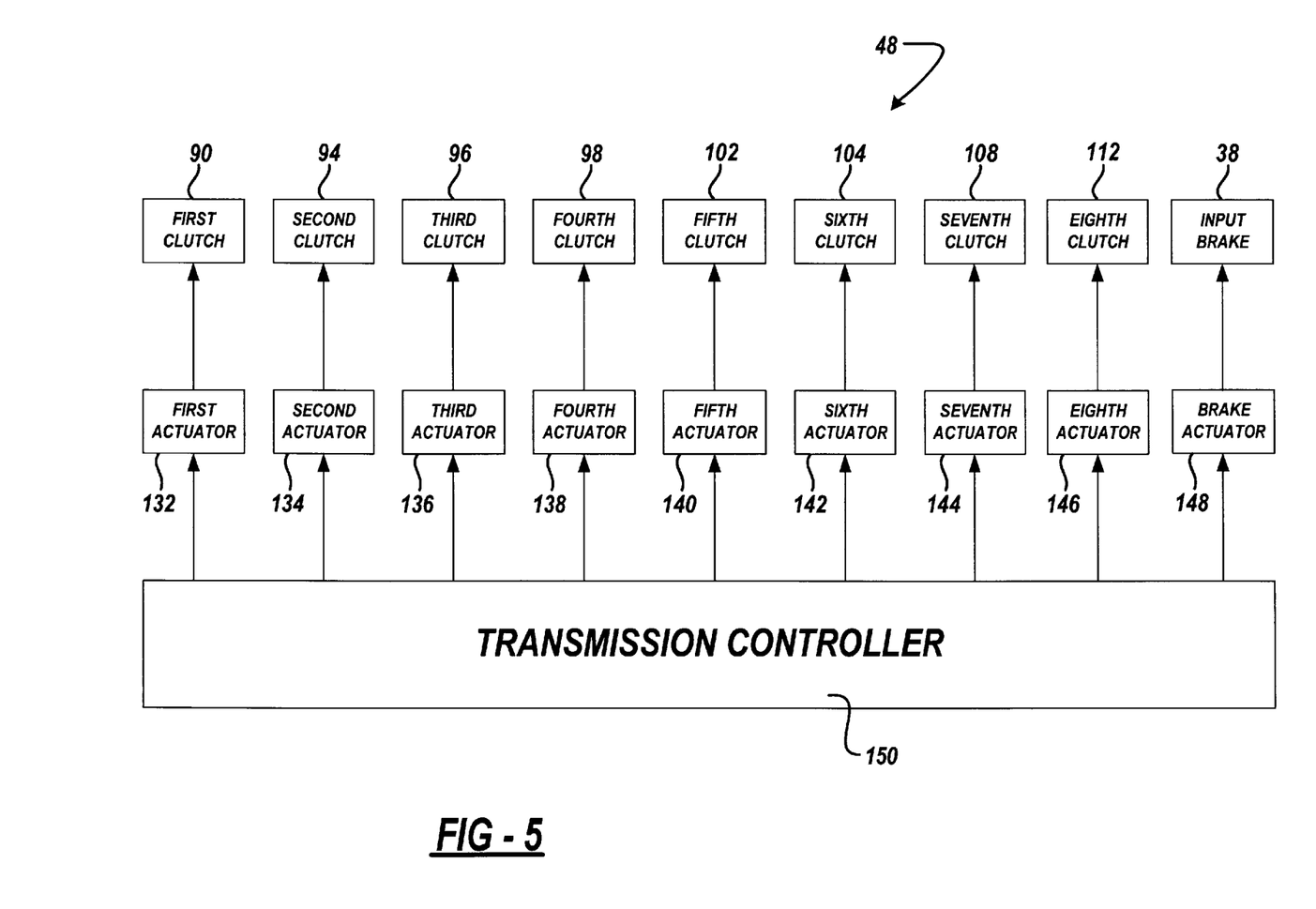
FIG. 5 is a diagram of the transmission shift control system associated with the hybrid transmission of the present invention.

As will be understood, the second through eighth controllable overrunning clutches are substantially identical in structure and function to that described for first overrunning clutch 90. Thus, common suffixes are used with corresponding reference numerals to identify similar components. Moreover, power-operated clutch actuators are schematically shown in FIG. 5 for the seven other controllable overrunning clutches and are designated by corresponding reference numerals 134 through 146. Power-operated clutch actuators 134 through 146 are substantially similar in function to that of clutch actuator 132. In addition, a power-operated brake actuator 148 is shown to control actuation input brake 38. With input brake 38 in its locked mode, flywheel 50 and input shaft 40 are held against rotation. With input brake 38 in its release mode, power from engine 12 is transmitted through damper unit 36 to input shaft 40. Brake actuator 148 preferably is a variable control device so as to permit progressive shifting of input brake 38 between its locked and released modes. Control system 48 further includes a transmission controller 150 which coordinates actuation of clutch actuators 132–146, input brake actuator 148 and electric motor 46.

Figure 6:
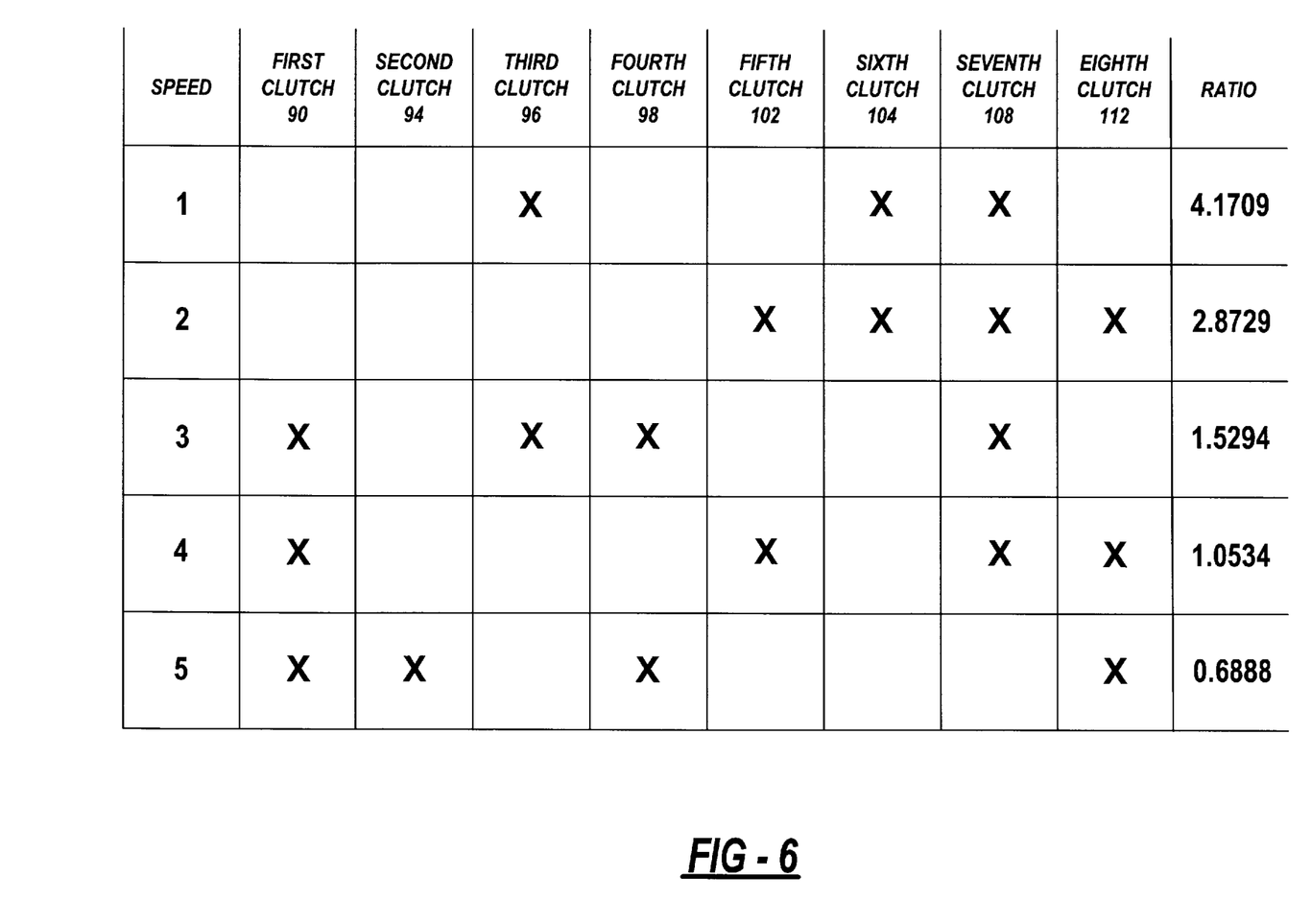
FIG. 6 is a chart listing the actuated status of various power-operated clutches for establishing the different speed ratios.

Referring to FIG. 6, a chart of the different speed ratios and the corresponding clutch actuator conditions is shown. Specifically, an "X" indicates that the corresponding clutch is in its locked mode. Exemplary numerical speed ratios are provided to illustrate the similarity to commercially-accepted conventional automatic transmission. These ratios are established by the gear components of geartrain 44 having the following number of gear teeth:

| Component | No. of Teeth |
|---|---|
| First sun gear 60 | 28 |
| First ring gear 62 | 62 |
| First planet gears 64 | 17 |
| Second sun gear 68 | 44 |
| Second ring gear 70 | 76 |
| Second planet gears 72 | 16 |
| Third sun gear 76 | 36 |
| Third ring gear 78 | 68 |
| Third planet gears 80 | 16 |

Obviously, the speed ratios can be modified to fit the requirements of each particular vehicular application. As will be detailed, electric motor 46 is used to synchronize the rotary speed of various components of geartrain 44 prior to locking of the clutches. Thus, electric motor 46 serves two distinct functions, namely, (1) to act as a power source for delivering electrically-generated motive power through transmission 14 to wheels 20 and (2) to react with engine torque for synchronization during gearshifts.

To establish the first gear ratio, third clutch 96 is locked to lock first planetary gearset 54, sixth clutch 104 is locked to brake rotation of transfer drum 88 and second ring gear 70, and seventh clutch 108 is locked to brake rotation of third sun gear 76. This causes output shaft 42 to be driven at the first speed ratio relative to driven rotation of input shaft 40. When transmission 14 is shifted from first gear into second gear, third clutch 96 is released and fifth clutch 102 is locked for coupling rotor 100 to first transfer shaft 84. Thereafter, motor 46 is controllably actuated to react against power delivered to input shaft 40 by engine 12, thereby causing the speed of first sun gear 60 and input shaft 40 to slow relative to output shaft 42. When the rotary speed of first sun gear 60 reaches zero, eighth clutch 112 is locked to hold first sun gear 60 against rotation and establish the second gear ratio. Thereafter, fifth clutch 102 is released.

When transmission 14 is shifted from second gear into third gear, sixth clutch 104 is released to permit rotation of transfer drum 88, eighth clutch 112 is released to permit rotation of first transfer shaft 84, and third clutch 96 is locked for driving first planetary 54 at a direct speed ratio. Thereafter, fourth clutch 98 is locked such that electric motor 46 is coupled to transfer drum 88 and motor power is applied thereto. When the rotary speed of transfer drum 88 and motor matches that of third ring gear 78, first clutch 90 is locked for establishing the third speed ratio. Following engagement of first clutch 90, fourth clutch 98 can be released.

When transmission 14 is shifted from third gear into fourth gear, third clutch 96 is released and fifth clutch 102 is locked for coupling rotor 100 of electric motor 46 to first transfer shaft 64. Similar to the one-two shift, once motor power has reacted with engine power to slow first sun gear 60 to a stop, eighth clutch 112 is locked to brake first sun gear 60 and establish the fourth speed ratio. Upon establishment of fourth gear, fifth clutch 102 can be released. The fifth gear is established by releasing seventh clutch 108 such that second transfer shaft 86 and third sun gear 76 are released for driven rotation. Fourth clutch 98 is engaged to couple rotor 100 of electric motor 46 to transfer drum 88. Thereafter, motor 46 is activated to drive transfer drum 88. Once the speed of second transfer shaft 86 has been reduced to match that of output shaft 42, second clutch 94 is locked and the fifth speed ratio is established. Reverse gear is established in the same manner as first gear with the exception that the rotary direction of electric motor 46 is reversed.

In each speed change, the motor torque reacts against the engine torque to establish a synchronous speed at which point the gear change is completed. Moreover, since the motor torque reacts against engine torque, transmission 14 continues to transmit positive torque to output shaft 42 during shifts, thereby resulting in a true powershift. The rate of speed change may be controlled by controlling the relationship between motor torque and engine torque during the shifts. Transmission 14 is also capable of downshifting under power, since the torque reactions are reversed (i.e., the motor torque accelerates the engine during downshifts). An engine management control system 160 that increases torque during upshifts and reduce torque during downshifts is used in conjunction with transmission shift control system 48 to assist electric motor 46 in providing smooth powershifts.

Geartrain 44 is shown in FIGS. 2 and 3B, to further include a parking pawl wheel 162 that is fixed to output shaft 42 and a parking pawl 164 that is operable to engage wheel 162 for releasably locking output shaft 42 to a stationary member (i.e. the housing of transmission 14) to prevent rotation of output shaft 42. Parking pawl 164 is operable to release output shaft 42 when the gearshift lever is moved out of its PARK position and lock output shaft 42 when the gearshift lever is returned to its PARK position.

The hybrid powertrain system of the present invention includes two drive power sources, namely engine 12 and motor assembly 46 of transmission 14. Motor assembly 46 of transmission 14 is connected to a battery 170 and can be selectively shifted into any of a DRIVE state, a CHARGING state, and a NO-LOAD state by powertrain control system 34. In the DRIVE state, transmission 14 functions as a motor-driven gearbox that is driven by electrical energy drawn from battery 170. In the CHARGING state, motor 46 of transmission 14 functions as an electric generator for storing electric energy in battery 170. In the NO-LOAD state, electric motor 46 is off and rotor shaft 100 is permitted to rotate freely relative to stator 101.

Figure 7:
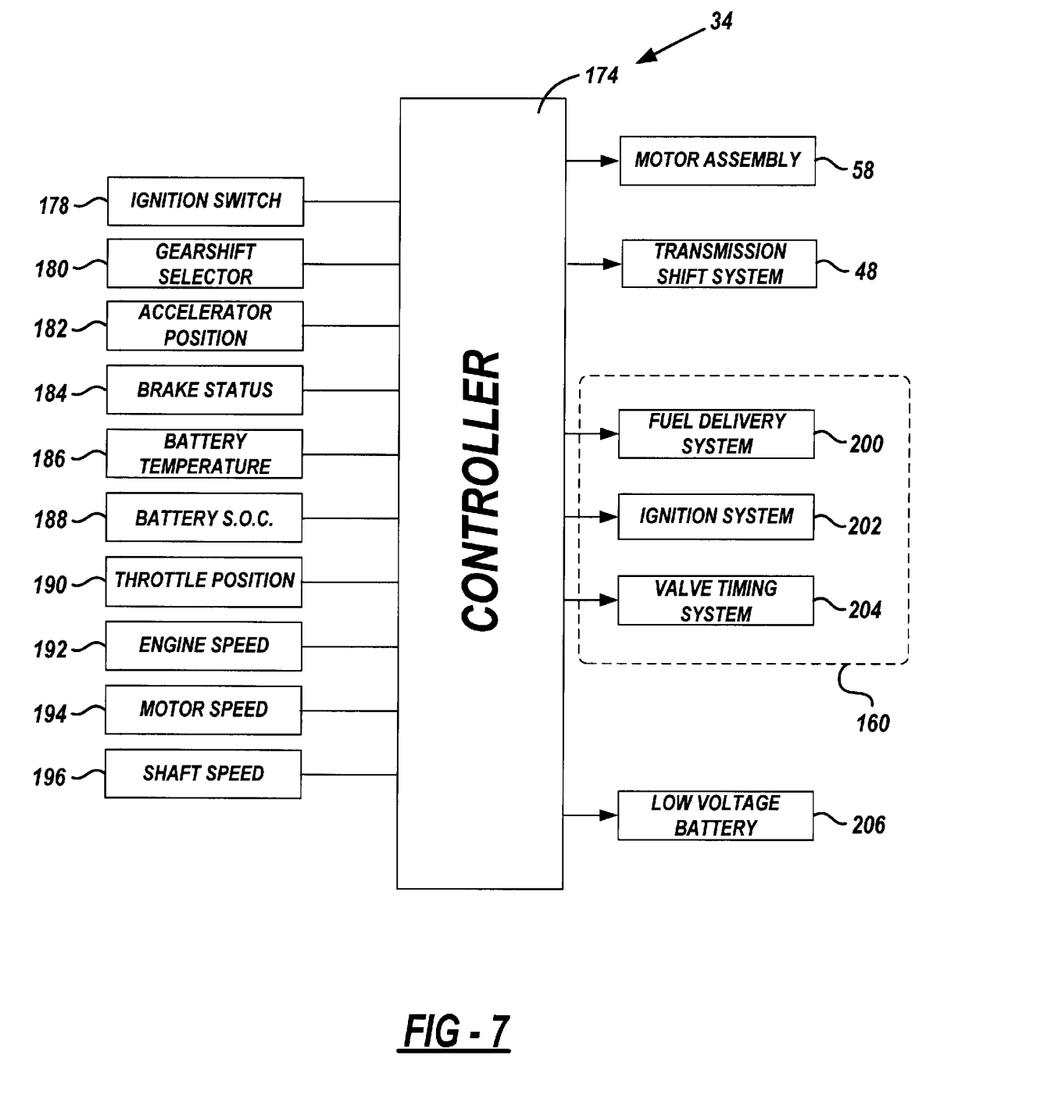
FIG. 7 is a diagramatical illustration of a hybrid powertrain control system adapted for use with the present invention.

Control system 34 is provided for controlling operation of the hybrid powertrain shown in FIG. 1. Control system 34 includes a central controller 174 adapted to receive input signals from various sensors and input devices cumulatively identified in FIG. 1 as vehicle sensors 176. Controller 174 is principally comprised of a microcomputer having a central processing unit (CPU), random-access memory (RAM), read-only memory (ROM), and an input-output actuator interface. Controller 174 performs data processing operations to execute various control routines according to control programs and/or maps stored in the ROM. Controller 174 receives data from an ignition switch 178, a gearshift lever switch 180, an accelerator position sensor 182, a brake status switch 184, a battery temperature sensor 186, a battery SOC (state of charge) sensor 188, and a throttle position sensor 190. In addition, other inputs include an engine speed sensor 192, a motor speed sensor 194, and an output shaft speed sensor 196. Ignition switch 178 is closed when the vehicle key is turned on. Corresponding switches in gearshift selector switch 180 are closed when the gearshift mechanism is located in its Park (P), Neutral (N), Reverse (R) and Drive (D) positions. Accelerator position sensor 182 senses the depression angle of an accelerator pedal. Brake status switch 184 is turned on when the brake pedal is depressed. Battery temperature 186 senses the temperature of battery 170. Battery SOC sensor 188 senses the charge level of battery 170. Throttle position sensor 190 senses the degree of opening of the engine throttle valve. Engine speed sensor 192 senses a parameter indicative of the rotary speed of the drive shaft of engine 12. Motor speed sensor 194 senses a parameter indicative of the rotary speed of rotor 100 of motor assembly 46. Finally, shaft speed sensor 196 senses the rotary speed of output shaft 42 or propshaft 16 and can further be used as an indication of vehicle speed.

Based on the operating information inputted to controller 174, a mode of operation of the hybrid powertrain is selected and controller 174 sends electric control signals to various power-operated control devices. Specifically, controller 174 monitors and continuously controls actuation of electric motor 46 of transmission 14, transmission shift control system 48 via controller 150, and various engine management systems for controlling the speed and torque generated by engine 12. These engine management control systems 160 may include a fuel delivery system 200, an ignition system 202, and a valve timing system 204. A low voltage battery 206 may serve as the power supply for controller 174.

There are four modes of operation for vehicle 10, namely: (a) an electric mode; (b) a hybrid mode; (c) an engine mode; and (d) a regenerative mode. In the electric mode, engine 12 is off and only electric motor 46 provides motive power to vehicle 10. In the hybrid mode, both engine 12 and electric motor 46 provide motive power to vehicle 10. In the engine mode, only engine 12 provides motive power to vehicle 10. In the regenerative mode, a portion of the engine power is absorbed by motor 46 to charge battery 170. The transition from one mode to the next is smooth and transparent to the vehicle operator since controller 170 selects the most appropriate mode depending on various vehicle operating conditions including vehicle speed, accelerator demand and battery charge status.

When operating in the electric mode, engine 12 is stopped and input brake 38 is locked to brake rotation of first planet carrier 66 such that electric motor power drives geartrain 44 to establish a speed ratio drive connection with output shaft 42. In particular, fifth clutch 102 is locked to couple rotor 100 of electric motor 46 to first transfer shaft 64, sixth clutch 104 is locked to brake rotation of transfer drum 88, and seventh clutch 108 is locked to brake rotation of third sun gear 76. Thereafter, controlled actuation of electric motor 46 acts to drive first sun gear 60 for transferring power through geartrain 44 to output shaft 42. Since first planet carrier 66 is held against rotation, motor 46 must be driven in the reverse direction to establish the forward drive. Again, the reverse mode is simply established by reversing the rotary direction of motor 46. It is contemplated that the vehicle can be driven up to about 30 miles per hour in the electric mode to effectively reduce overall fuel consumption during urban driving conditions. While in the electric mode, motor 46 may be used to start engine 12 by releasing input brake 38.

When the powertrain control system determines that the vehicle should operate in the hybrid mode, engine 12 is started and motor 46 is slowed to reverse its direction. Thereafter, third clutch 96 is engaged. In operation, the hybrid mode can be used with transmission shifted through each of its available forward gear ratios. To operate in the engine only mode, motor 46 is only used to shift transmission 14. Since no conventional master clutch (or torque converter) is required between flywheel unit 36 and transmission 14, motor 46 may be located in the bellhousing immediately behind the flywheel. This position permits the motor torque to be multiplied by the transmission ratio and the large diameter motor can produce high torque at low electric power levels.

Figure 8:
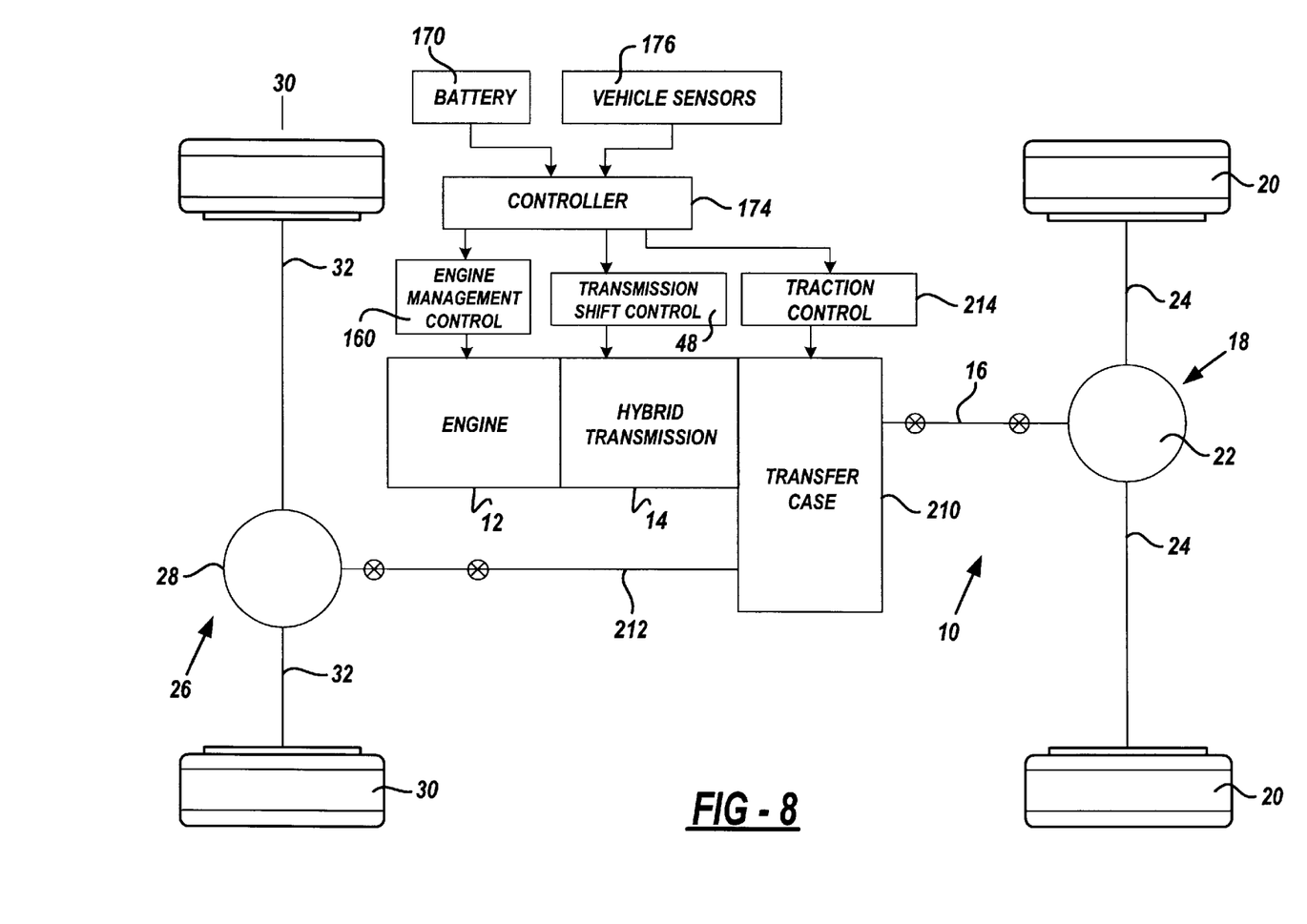
FIG. 8 is a schematic layout of a four-wheel drive hybrid motor vehicle equipped with transmission of the present invention.

Referring now to FIG. 8, the hybrid powertrain of the present invention is shown in vehicle 10 to now be installed in a four-wheel drive arrangement with output shaft 42 of transmission 14 delivering drive torque to the input shaft of a transfer case 210. Transfer case 210 has a first output shaft coupled to rear propshaft 16 and second output shaft coupled to a front propshaft 212. A traction clutch is provided in transfer case 210 to selective and/or automatically distribute drive torque from transmission output shaft 42 to one or both of propshafts 16 and 212. If traction clutch is electrically-actuated, a traction control system 214 would be used to control actuation.

What is claimed is:

1. A transmission for use in a hybrid powertrain of a motor vehicle having an internal combustion engine and a driveline, comprising:
    an input shaft selectively driven by the engine;
    an output shaft interconnected to the driveline;
    a planetary gear transmission operably interconnecting said input shaft and said output shaft and including first, second and third gearsets, said first gearset having an input driven by said input shaft and an output, said second gearset having an input driven by said output of said first gearset and an output, and said third gearset having an input driven by said output of said second gearset and an output driving said output shaft;
    a first transfer shaft operably connected to said first gearset;
    a transfer drum operably connected to said second gearset;
    a second transfer shaft operably connected to said third gearset;
    power-operated clutches for selectively engaging said planetary gear transmission to establish a plurality of gear ratio drive connections between said input shaft and said output shaft; and
    an electric motor/generator operable to selective drive one of said first transfer shaft and said transfer drum, said electric motor/generator is operable in a first mode for transferring motive power through said planetary gear transmission to said output shaft, and is further operable in a second mode for synchronizing rotation of said input shaft relative to said output shaft during shifting of said planetary gear transmission between said gear ratios.

2. The transmission of claim 1 wherein said first gearset includes a first carrier driven by said input shaft and rotatably supporting a set of first planet gears, a first sun gear driven by said first transfer shaft, and a first ring gear, said first planet gears meshing with said first sun gear and said first ring gear.

3. The transmission of claim 2, wherein said second gearset includes a second sun gear driven by said first ring gear, a second ring gear coupled to said transfer drum, and a set of second planet gears rotatably supported from a second carrier and meshed with said second sun gear and said second ring gear.

4. The transmission of claim 3, wherein said third gearset includes a third sun gear coupled to said second transfer shaft, a third ring gear coupled to said second carrier, and a set of third planet gears meshed with said third sun gear and said third ring gear and which are rotatably supported from a third carrier coupled to said output shaft.

5. The transmission of claim 4 wherein said power-operated clutches comprise:
    a first clutch operable for selectively coupling said transfer drum to said third ring gear for locking said second gearset;
    a second clutch operable for selectively coupling said second transfer shaft to said output shaft for locking said third gearset; and
    a third clutch operable for selectively coupling said first transfer shaft to said input shaft for locking said first gearset.

6. The transmission of claim 5 further comprising:
    a fourth clutch operable for selectively coupling a rotor of said motor/generator to said transfer drum;
    a fifth clutch operable for selectively coupling said rotor to said first transfer shaft; and
    a sixth clutch operable for selectively coupling said transfer drum to a stationary member.

7. The transmission of claim 6 further comprising:
    a seventh clutch operable for selectively coupling said second transfer shaft to said stationary member; and
    an eighth clutch operable for selectively coupling said first transfer shaft to said stationary member.

8. The transmission of claim 7 wherein a first gear ratio is established when said third, sixth and seventh clutches are engaged.

9. The transmission of claim 8 wherein said transmission is shifted from said first gear ratio to a second gear ratio by releasing said third clutch and engaging said fifth clutch for coupling said rotor to said first transfer shaft, and wherein said electric motor/generator is thereafter controlled for slowing rotation of said first transfer shaft until it is stopped, whereby upon said first transfer shaft being stopped said eighth clutch is engaged and said fifth clutch is released.

10. A hybrid powertrain for a motor vehicle having first and second drivelines, comprising:
    an internal combustion engine having an engine output shaft; and
    a transmission having an input shaft selectively driven by said engine output shaft, an output shaft connected to the first driveline, a planetary gear assembly operably interconnecting said input shaft and said output shaft and including first, second and third gearsets, said first gearset having an input driven by said input shaft and an output, said second gearset having an input driven by said output of said first gearset and an output, and said third gearset having an input driven by said output of said second gearset and an output driving said output shaft, a first transfer shaft operably connected to said first gearset, a transfer drum operably connected to said second gearset, a second transfer shaft operably connected to said third gearset, power-operated clutches for selectively engaging said planetary gear transmission to establish a plurality of gear ratio drive connections between said input shaft and said output shaft, and an electric motor/generator operable to selective drive one of said first transfer shaft and said transfer drum, said electric motor/generator is operable in a first mode for transferring motive power through said planetary gear transmission to said output shaft, and is further in a second mode for synchronizing rotation of input shaft relative to said output shaft during shifting of said planetary gear transmission between said gear ratios.

11. The hybrid powertrain of claim 10 wherein said first gearset of said transmission includes a first carrier driven by said input shaft and rotatably supporting first planet gears, a first sun gear driven by said first transfer shaft, and a first ring gear, said first planet gears meshing with said first sun gear and said first ring gear.

12. The hybrid powertrain of claim 11 wherein said second gearset of said transmission includes a second sun gear driven by said first ring gear, a second ring gear coupled to said transfer drum, and a set of second planet gears rotatably supported from a second carrier and meshed with said second sun gear and said second ring gear.

13. The hybrid powertrain of claim 12 wherein said third gearset of said transmission includes a third sun gear coupled to said second transfer shaft, a third ring gear coupled to said second carrier, and a set of third planet gears meshed with said third sun gear and said third ring gear and which are rotatably supported from a third carrier coupled to said output shaft.

14. The hybrid powertrain of claim 13 wherein said power-operated clutches comprise:
a first clutch operable for selectively coupling said transfer drum to said third ring gear for locking said second gearset;
a second clutch operable for selectively coupling said second transfer shaft to said output shaft for locking said third gearset; and
a third clutch operable for selectively coupling said first transfer shaft to said input shaft for locking said first gearset.

15. The hybrid powertrain of claim 14 further comprising:
a fourth clutch operable for selectively coupling a rotor of said motor/generator to said transfer drum;
a fifth clutch operable for selectively coupling said rotor to said first transfer shaft; and
a sixth clutch operable for selectively coupling said transfer drum to a stationary member.

16. The hybrid powertrain of claim 15 comprising:
a seventh clutch operable for selectively coupling said second transfer shaft to said stationary member; and
an eighth clutch operable for selectively coupling said first transfer shaft to said stationary member.

17. The hybrid powertrain of claim 16 wherein a first gear ratio is established when said third, sixth and seventh clutches are engaged.

18. The hybrid powertrain of claim 17 wherein said transmission is shifted from said first gear ratio to a second gear ratio by releasing said third clutch and engaging said fifth clutch for coupling said rotor to said first transfer shaft, and wherein said electric motor/generator is thereafter controlled for slowing rotation of said first transfer shaft until it is stopped, whereby upon stopping of rotation of said first transfer shaft and thereafter locking said eighth clutch is engaged and releasing said fifth clutch is released.

19. The hybrid powertrain of claim 10 further comprising a transfer case interconnecting said output shaft of said transmission to the first driveline and further operable to selectively transfer drive torque to the second driveline for establishing a four-wheel drive mode.

20. A drivetrain for a vehicle having an engine with a drive output, comprising:
an input shaft operably interconnected to and driven by the drive output;
an output shaft operably interconnected to and selectively driven by said input shaft;
a planetary gear transmission operably interconnected with said input shaft and said output shaft for establishing said operable interconnection therebetween, said planetary gear transmission comprising a first planetary gear set operably attached to said input shaft and a second planetary gearset, said second planetary gearset operably attached to a third planetary gearset, said third planetary gearset driving said output shaft;
a first transfer shaft operably interconnected to said first planetary gearset;
a transfer drum selectively driving said second and third planetary gearsets and enclosing said first, second and third planetary gearsets;
a second transfer shaft interconnected to said third planetary gearset and selectively engaged to said output shaft; and
an electric motor selectively engaged with one of said first transfer shaft and said transfer drum wherein said first second and third planetary gearsets, said first transfer shaft, said transfer drum and said second transfer shaft are selectively manipulated for establishing one of a plurality of drive ratios.

21. The drivetrain of claim 20 wherein the drivetrain is operable in one of a plurality of modes.

22. The drivetrain of claim 21, wherein said plurality of modes comprises and electric mode, a hybrid mode, and engine mode and a regenerative mode.

23. The drivetrain of claim 21 further comprising a controller for operating the drivetrain in one of said plurality of modes in response to received signals.

24. A vehicle, comprising:
an engine having a drive output;
a drivetrain including an input shaft operably interconnected to and driven by said engine drive output;
an output shaft operably interconnected to and selectively driven by said input shaft;
a planetary gear transmission operably interconnected with said input shaft and said output shaft for establishing said interconnections therebetween, said planetary gear transmission comprising a first planetary gearset operably coupled to said input shaft and a second planetary gearset, said second planetary gearset operably coupled to a third planetary gearset, said third planetary gearset driving said output shaft;
a first transfer shaft operably connected to said first planetary gearset;
a transfer drum selectively driving said second and third planetary gearsets;
a second transfer shaft operably connected to said third planetary gearset and selectively engagable with said output shaft, wherein said first second and third planetary gearsets, said first transfer shaft, said transfer drum and said second transfer shaft are selectively manipulated for establishing one of a plurality of drive ratios; and
a pair of wheels interconnected with said output shaft and rotatably driven by said output shaft;
electric motor having an output rotor;
a first clutch for selectively coupling said output rotor to said first transfer shaft; and
a second clutch for selectively coupling said output rotor to said transfer drum.

25. The vehicle of claim 24 further comprising a battery in electrical communication with said electric motor.

26. The vehicle of claim 24 wherein said drivetrain is operable in one of a plurality of modes.

27. The vehicle of claim 26 wherein said plurality of modes comprises an electric mode, a hybrid mode, an engine mode and a regenerative mode.

28. The vehicle of claim 26 further comprising a controller for operating said drivetrain in one of said plurality of modes in response to received signals.

29. The vehicle of claim 28 further comprising a plurality of sensors in electrical communication with said controller, said plurality of sensors monitoring operational parameters of the vehicle and providing said signals to said controller for operating said drivetrain.

* * * * *